May 21, 1968 YUZO TAKANO 3,384,716

SWITCH MEANS FOR AUTOMATIC SELECTION OF MONAURAL AND STEREO OPERATION OF AN FM STEREO RECEIVER

Filed Dec. 29, 1965

INVENTOR.
YUZO TAKANO

BY Hill, Sherman, Meroni, Gross & Simpson ATTORNEYS

United States Patent Office 3,384,716

Patented May 21, 1968

3,384,716

SWITCH MEANS FOR AUTOMATIC SELECTION OF MONAURAL AND STEREO OPERATION OF AN FM STEREO RECEIVER

Yuzo Takano, Tokyo, Japan, assignor to Kabushikikaisha Taiko Denki, seisakusho (Taiko Electric Works Ltd.), Tokyo, Japan, a corporation of Japan Filed Dec. 29, 1965, Ser. No. 517,401
Claims priority, application Japan, Dec. 30, 1964, 39/102,813
2 Claims. (Cl. 179—15)

ABSTRACT OF THE DISCLOSURE

A switching circuit for automatically rendering the stereo channels of an FM stereo receiver operative upon sensing the reception of a stereo broadcast signal. The switching circuit includes means for detecting the presence of a stereo or monaural signal. The detector means is connected to an indicating circuit which gives visual indication of the presence of a stereo station. Additionally, the detector means is connected to a switching circuit which automatically causes the right and left channels of the stereo receiver to be rendered operative in response to sensing the reception of a stereo station and to be rendered inoperative and function as a monaural audio system upon sensing the reception of a monaural station.

This invention relates to an FM stereo receiver and has more particular reference to such a receiver adapted for receptions of FM monaural signals as well as stereo signals and including means for distinguishably indicating FM stereo and FM monaural receptions.

It is one object of this invention to provide an FM stereo receiver capable of receiving FM stereo and monaural signals.

It is another object of this invention to provide an FM stereo receiver capable of receiving FM stereo and monaural signals by controlling a right and left signal separating stage without the necessity of special means for separating the stereo and monaural signals.

It is still another object of this invention to provide an FM stereo receiver in which stereo and monaural receptions are distinguishably indicated and at the same time a right and left signal separating stage is controlled by a signal used for control of the indication, thereby establishing the operative condition for the stereo or monaural reception.

Figure 1:
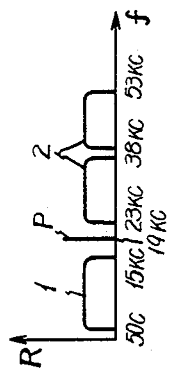
Figure 2:
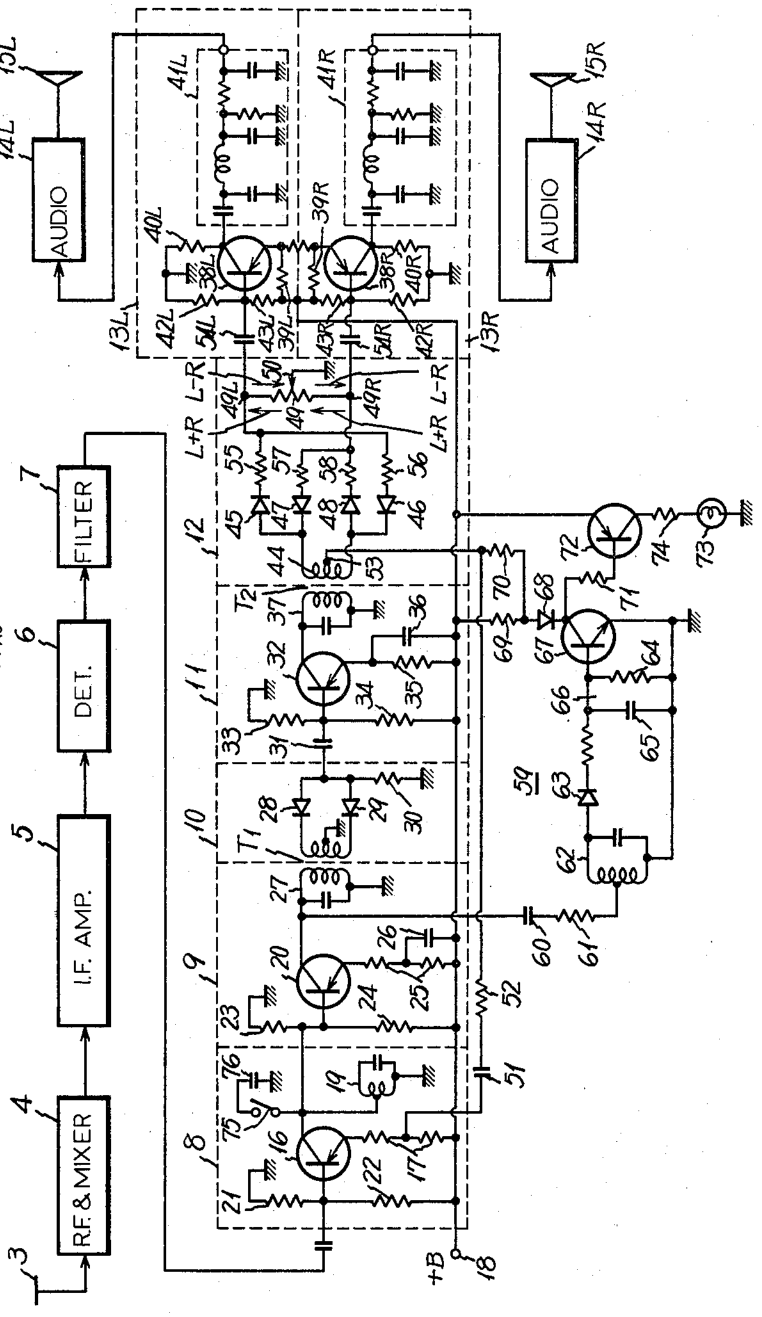

Other objects, features and advantages of this invention will become apparent from the following description taken in conjunction with the accompanying drawings, in which:

FIGURE 1 is a frequency spectrum diagram for explaining the FM stereo receiver according to this invention; and FIGURE 2 is a connection diagram illustrating one example of the FM stereo receiver according to this invention.

Before describing the present invention an FM stereo receiver will generally be explained with reference to FIGURE 1.

There has been proposed an FM stereo broadcasting system which comprises converting left and right sound signals L and R into a sum signal $(L+R)$ and a difference signal $(L-R)$, obtaining from the difference signal $(L-R)$ a modulated subcarrier signal produced by carrier-suppression-amplitude-modulating a subcarrier, arranging the frequency band of this signal in the upper band of the sum signal $(L+R)$, frequency-modulating a main carrier by such two signals and transmitting it. One example of the frequency spectrum in such a stereo broadcasting system is as illustrated in FIGURE 1, which consists of an $(L+R)$ signal spectrum 1 ranging from, for example, 50 c./s. to 15 kc./s., a modulated $(L-R)$ signal spectrum 2 obtained by balanced-modulation of a subcarrier of, for example, 38 kc./s. with an $(L-R)$ signal and covering a band of 30 kc./s. and a pilot signal P of 19 kc./s. disposed between the spectrums 1 and 2. An FM stereo signal is obtained by simultaneous frequency-modulation of a main carrier with the spectrums 1 and 2 and the pilot signal P.

Such an FM stereo broadcasting signal is received by, for example, an antenna 3, as illustrated in FIGURE 2, and amplified by a high-frequency stage 4, thereafter being converted into an intermediate-frequency signal. Then, the signal is amplified again by an intermediate-frequency stage 5 and frequency-discriminated by a demodulating stage 6 and then it is demodulated through a filtering stage to be a stereo compound signal consisting of the sum signal $(L+R)$, the pilot signal P and the demodulated subcarrier signal S. The pilot signal P is picked up by a pilot signal separating stage 8 and amplified by a pilot signal amplifying stage 9, thereafter being frequency- multiplied by a multiplying stage 10. The multiplied signal is amplified by an amplifying stage 11 and applied as a local subcarrier to a right and left signal separating stage 12. The stereo composite signal having passed the pilot signal separating stage 8 is applied to the right and left signal separating stage 12 and mixed with the local subcarrier, thereafter being divided into right and left signals R and L. Then, the right and left signals R and L only are picked up respectively by amplifying and filtering stages 13R and 13L. Such right and left signals R and L are amplified respectively by low-frequency stages 14R and 14L and applied to right and left speakers 15R and 15L respectively. In this manner, stereophonic sound is reproduced.

When a stereo signal broadcast is not carried out, through the same channel as that for the stereo signals, the main carrier of, for example, 69 mc./s. for the stereo signal is frequently frequency-modulated by a monaural signal ranging from, for instance, 50 c./s. to 15 kc./s. for an FM monaural broadcast.

Now, the present invention will hereinafter be described in detail.

Since the high-frequency stage 4, the intermediate-frequency stage 5, the demodulating stage 6, the filtering stage 7 and the low-frequency stages 14L and 14R in FIGURE 2 may be well-known ones, no detailed explanation will be given. In order to facilitate a better understanding of this invention, the other remaining circuits will briefly be described by way of example. The pilot separating stage 8 has, for example, a transistor 16, to the base of which are applied the sum signal $(L+R)$, the pilot signal P and the modulated subcarrier, while the emitter of the transistor 16 is connected through an emitter resistor 17 to a power source terminal 18. From the middle point of the emitter resistor 17 or directly from the emitter, there is obtained a stereo composite signal or a monaural signal. Between the collector and the ground, there is connected a tuning circuit 19 synchronized with the pilot signal P of 19 kc./s. The pilot signal P separated and picked up by the separating stage 8 is applied to the base of a transistor 20 of the amplifying stage 9. The reference numerals 21 and 22 indicate base bias resistors of the transistor 16. The reference numerals 23 and 24 designate base bias resistors of the transistor 20, the reference numeral 25 identifies an emitter resistor of the transistor 20 and 26 represents a by-pass capacitor connected in parallel to the resistor 25. Between the collector of the transistor 20 and the ground, there is similarly provided a tuning circuit 27 synchronized with the pilot signal P. On the secondary side of a transformer $T_1$ having the tuning circuit as the primary side thereof, there is provided a multiplying stage 10 consisting of diodes 28 and 29 connected in parallel to each other and a load resistor 30 connected to one connecting point therebetween. The pilot signal P obtained in the tuning circuit 27 is frequency-multiplied by the multiplying stage 10 and applied to the base of a transistor 32 of the amplifying stage 11 through a coupling capacitor 31 connected to the connecting point of the load resistor 30 with the diodes 28 and 29. The reference numerals 33 and 34 designate base bias resistors of the transistor 32, 35 identifies an emitter resistor of the transistor 32 and 36 indicates a by-pass capacitor connected in parallel to the emitter resistor 35. Between the collector of the transistor 32 and the ground, there is provided a tuning circuit 37 synchronized with a frequency twice as high as that of the pilot signal P, namely with a local subcarrier of 38 kc./s. Further, the right and left amplifying and filtering stages 13R and 13L are respectively provided with transistors 38R and 38L, the emitters of these transistors 38R and 38L being connected to the power source terminal 18 respectively through resistors 39R and 39L and the collectors being grounded through load resistors 40R and 40L and connected to low-pass filters 41R and 41L. The filters 41R and 41L are adapted to ground the high-frequency component and pass therethrough only the right and left signals R and L of low frequency, and the signals R and L are applied respectively to the low-frequency stages 14R and 14L. The reference numerals 42L, 43L and 42R, 43R identify base bias resistors of the transistors 38L and 38R. Further, the transistors 20 and 32 are so adapted as to be supplied with power respectively through the emitter resistors 25 and 35.

In the present invention a switching circuit is employed as the right and left signal separating stage and this switching circuit is controlled depending upon stereo signal reception or monaural signal reception, thereby establishing the operative condition for stereo and monaural receptions. To this end, the separating stage 12 includes a secondary coil 44 of a transformer $T_2$ having as the primary side a tuning circuit 37 of the local subcarrier amplifying stage 11. To both ends of the coil 44, there are connected two switching elements such, for example, as diodes 45 and 46 which are connected in series to each other in the forward direction. Further, two switching elements such, for example, as diodes 47 and 48 connected in series to each other in the forward direction are so connected as to be opposite in direction to the diodes 45 and 46. Series resistors 57 and 58 are each connected to one electrode of each of the diodes 45 and 46, while series resistors 55 and 56 are also each connected to one electrode of each of the diodes 47 and 48. The outside connecting point of the resistors 57 and 58 and that of the resistors 55 and 56 are connected to each other by a load resistor 49 and the middle point 50 of the load resistor 49 is grounded. The emitter of the transistor 16 or the middle point of the emitter resistor 17 in the pilot signal separating stage 8 is connected to the middle point 53 of the secondary coil 44 through a coupling capacitor 51 and, if necessary, through a resistor 52. Both ends of the load resistor 49 are connected to the base of the transistors 38L and 38R of the amplifying and filtering stage respectively through coupling capacitors 54L and 54R. Further, it is preferred to make the middle point 50 of the load resistor 49 movable thereby to effect balanced adjustment of the right and left signals.

In order to constitute means 59 for detecting stereo or monaural reception, a tuning circuit 62 tuned to the pilot signal P of 19 kc./s. is connected to the collector of the transistor 20 through a coupling capacitor 60 and, if necessary, through a resistor 61. One end of the tuning circuit 62 is grounded and the other end is also grounded through a rectifying element such, for example, as a diode 63 and a load circuit 66 consisting of a resistor 64 and a capacitor 65. The connecting middle point of the diode

63 and the load circuit 66 is connected to the base of an npn-type transistor 67, the emitter of the transistor 67 being grounded and the collector having connected thereto a unidirectional conductive element, for example, a diode 68 in such a manner as to be forward with respect to the transistor 67. The free end of the diode 68 is connected through a resistor 69 to the power source terminal 18 and is connected through a resistor 70 to the middle point 53 of the secondary coil 44 of the separating stage 12. Meanwhile, the collector of the transistor 67 is connected through a resistor 71 to the base of a pnp-type transistor 72, the collector of the transistor 72 being grounded through indicating means, such as, for example, a lamp 73 and the emitter being connected to the power source element 18. In this manner an indicating circuit is formed. The reference numeral 74 identifies a resistor which may be incorporated in the indicating circuit, if necessary.

According to this invention described in the foregoing, in the case of stereophonic broadcasting signal reception the pilot signal P appears in the tuning circuit 62 of the detecting means 59 and the signal P is rectified by the diode 63 and then applied to the transistor 67, by which the transistor 67 is conducted under fully or almost saturated condition and the diode 68 is also conducted, thereby to hold the middle point 53 of the secondary coil 44 of the separating stage 12 substantially at the ground potential. Under such conditions a stereo composite signal is applied from the emitter of the transistor 16 through the coupling capacitor 51 to the middle point 53 of the secondary coil 44 of the separating stage 12 and a local subcarrier is applied from the local subcarrier amplifying stage 11 to both ends of the secondary coil 44. At the positive half cycle of the local subcarrier, for example, the diodes 45 and 46 become conductive and a modulated subcarrier S is thereby demodulated, producing a difference signal $(L-R)$ at one end 49L of the load resistor 49. The difference signal $(L-R)$ and a sum signal $(L+R)$ are added together, obtaining a left signal 2L at the one end 49L of the resistor 49. The left signal 2L is applied to the left speaker 15L through the amplifying and filtering stage 13L and the low-frequency stage 14L. Meanwhile, the diodes 47 and 48 become conductive at the negative half cycle of the local subcarrier and the modulated subcarrier S is thereby demodulated, producing a difference signal $(L-R)$ at the other end 49R of the load resistor 49. The difference signal $(L-R)$ and the sum signal $(L+R)$ are differentially added together, obtaining a right signal 2R at the other end of the resistor 49. The right signal 2R is applied to the right speaker 15R through the amplifying and filtering stage 13R and the low-frequency stage 14R. Thus, stereophonic sound signals are reproduced from the both speakers.

Further, since the collector of the transistor 67 comes to be substantially at the ground potential, the transistor 72 also becomes conductive thereby to light the lamp 73, indicating the stereophonic broadcasting signal reception.

In the case of monaural signal reception, the pilot signal P does not appear in the detecting means 59, so that the transistor 67 is in zero bias condition and hence non-conductive. As a result of this, the collector of the transistor 67 is held at substantially the same potential as that of the power source terminal 18 and a forward bias is applied to the diodes 45 and 48, flowing a current from the power source terminal 18 to the ground through the resistors 69 and 70, the middle point 53 of the secondary coil 44, the diodes 45 and 48, the resistor 49 and the middle point 50 of the resistor 49. Due to voltage drop caused when the current passes through the resistor 69, the potential of the anode of the diode 68 becomes lower than that of the power source terminal 18, while a potential, which is substantially the same as that of the power source terminal 18, is applied to the cathode of the diode 68 from the base of the transistor 72 through the resistor 71. As a result, the diode 68 is reversely biased and hence becomes non-conductive, so that the base current of the transistor 72 does not flow and the transistor becomes non-conductive thereby to turn out the lamp 73, thus indicating monaural signal reception. Meanwhile, since the diodes 45 and 48 of the separating stage 12 become conductive, monaural signals from the emitter of the pilot signal separating transistor 16 are divided into two at the middle point 53 of the secondary coil 44 and then applied respectively to the right and left speakers 15R and 15L through the diodes 48 and 45, the amplifying and filtering stages 13R and 13L and the low-frequency stages 14R and 14L, thus reproducing the monaural sound signals from the speakers.

In this case, it is preferred to select the values of the resistors 49, 69 and 70 in a manner so that the forward bias applied to the diodes 45 and 48 may be in the intermediate portion of the linearity region of the voltage-current characteristic of the diodes 45 and 48.

When noise is mixed in the band higher than the monaural signal band during the monaural signal reception, the pilot signal amplifying stage 9 operates and the switching elements of the right and left signal separating stage 12 also operate thereby to prevent the occurrence of the noise in the sound output. Accordingly, it is preferred to ground the collector of the transistor 16 through the switch 75 and the capacitor 76 is illustrated so as to ground the noise component of the band higher than the manaural signal band by closing the switch 75 during the monaural broadcasting signal reception. In the foregoing the detecting means 59 is connected to the collector of the transistor 20 to detect the stereo signal reception or the monaural signal reception, but the detecting means 59 may be connected to the collector of the pilot signal separating transistor 16 or to that of the local subcarrier amplifying transistor 32. However, in the case of connecting the detecting means 59 to the collector of the transistor 16, the noise component is liable to cause errors and in the case connecting the means 59 to the collector of the transistor 32, the noise component is also liable to actuate the separating stage 12 in an unbalanced manner. Further, in the latter case the tuning circuit 62 of the detecting means 59 is adapted to be tuned to the local subcarrier of 38 kc.

As has been described in the foregoing, according to this invention, both stereo and monaural signals can be received by a single receiver and in addition the right and left signal separating stage is composed of switching circuits, by which either monaural or stereo reception is effected by controlling whether a DC bias is applied to the switching elements or not, without the necessity of any special change-over circuit for the stereo and monaural signals. Accordingly, the receiver can be made simple in structure and small in size. Furthermore, since the right and left signal separating stage 12 is held in a balanced conditon by removing a DC bias to the switching elements of the stage 12 during stereo signal reception, separation of the right and left signals can be improved. Further, during monaural signal reception a DC bias is applied to the switching elements in the linearity region thereof, so that the monaural signal is not ever distorted by passing through the switching circuit. In addition the application and removal of the DC bias to and from the switching elements of the separating stage 12 can be carried out by making use of a signal of the circuit for indicating stereo or monaural reception.

In the foregoing transistors and diodes are used but other active elements such as vacuum tubes and other unidirectional conductive elements such as diode vacuum tubes can be employed. Further, the diodes 46 and 47 of the separating stage 12 may be dispensed with and other switching circuits may be used in place of them. The transistors of the detecting means 59 and the other parts may be those which are opposite in polarity to that illustraed. In such a case the polarity of the diodes and the power source, of course, are reversed.

It will be apparent that many modifications and variations may be effected without departing from the scope of the novel concepts of this invention.

I claim:

1. An AM stereo receiver comprising a receiving part including demodulating means for a stereo composite signal consisting of a sum signal, a modulated signal obtained by amplitude-suppression-modulation of a subcarrier with a difference signal and a pilot signal interpose between the two signals, pilot signal separating means arranged at the following stage of the demodulating means for selecting the pilot signal from the stereo composite signal, means for frequency-multiplying the pilot signal obtained from the output side of the pilot signal separating means, right and left signal separating means consisting of a switching circuit for receiving the frequency-multiplied signal as a local subcarrier, means for applying the stereo composite signal having passed through the pilot signal separating means to the right and left signal separating means, the right and left signal separating means mixing the stereo composite signal with the local subcarrier and dividing the resultant signals into right and left signals, speakers each corresponding to one of the right and left signals, means for respectively applying the right and left signals to the speakers, detecting means assiciated with the pilot signal separating means for detecting stereo and monaural signal reception, the detecting means including a tuning circuit turned to the pilot signal, a rectifier element rectifying the output of the tuning circuit and a first transistor circuit controlled by the output of the rectifier element, the first transistor circuit including at the output side thereof a diode in series therewith simultaneously conducting with the conduction of the first transistor circuit during stereo reception, and indicating means associated with the right and left signal separating means and including a second transistor circuit controlled by the first transistor circuit, the detecting means producing one voltage upon reception of a stereo signal and another voltage upon reception of a monaural signal thereby to cause the indicating means to distinguishably indicate the stereo and monaural receptions.

2. An FM stereo receiver as claimed in claim 1, wherein said right and left signal separating means include a transformer the primary winding of which is supplied with the local subcarrier, a series circuit consisting of a set of two diodes connected in the same direction, another series circuit consisting of a set of two diodes connected in the same direction, each set of diodes being connected to the terminals of the secondary coil of said transformer in opposite relationship, the stereo composite signal being applied to the neutral point of the secondary coil, and a potentiometer connected across the connection points of the respective diodes, the movable contact of the potentiometer being grounded.

References Cited

UNITED STATES PATENTS

| | | | |
|---|---|---|---|
| 3,294,912 | 12/1966 | Merritt | 179—15 |
| 3,288,936 | 11/1966 | Jabber | 179—15 |
| 3,264,414 | 8/1966 | Santille et al. | 179—15 |
| 3,219,760 | 4/1965 | Loughlin | 179—15 |

ROBERT L. GRIFFIN, *Primary Examiner.*